US011087506B2

(12) United States Patent
Schultz et al.

(10) Patent No.: US 11,087,506 B2
(45) Date of Patent: *Aug. 10, 2021

(54) SYSTEM AND PROCESS FOR COLOR-BALANCING A SERIES OF OBLIQUE IMAGES

(71) Applicant: Pictometry International Corp., Rochester, NY (US)

(72) Inventors: Stephen L. Schultz, West Henrietta, NY (US); Frank D. Giuffrida, Honeoye Falls, NY (US); Robert Gray, Canandiagua, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,347

(22) Filed: Mar. 2, 2020

(65) Prior Publication Data

US 2020/0202583 A1 Jun. 25, 2020

Related U.S. Application Data

(63) Continuation of application No. 16/191,232, filed on Nov. 14, 2018, now Pat. No. 10,580,169, which is a
(Continued)

(51) Int. Cl.
*G06K 9/00* (2006.01)
*G06T 11/00* (2006.01)
(Continued)

(52) U.S. Cl.
CPC .......... *G06T 11/001* (2013.01); *G06K 9/0063* (2013.01); *G06T 5/001* (2013.01);
(Continued)

(58) Field of Classification Search
CPC .......... G06T 11/001; G06T 5/001; G06T 5/40; G06T 7/90; G06K 9/0063; H04N 1/6077;
(Continued)

(56) References Cited

U.S. PATENT DOCUMENTS

| 2,273,876 A | 2/1942 | Lutz et al. |
| 3,153,784 A | 10/1964 | Petrides et al. |

(Continued)

FOREIGN PATENT DOCUMENTS

| AT | 331204 T | 7/2006 |
| BR | 0316110 | 9/2005 |

(Continued)

OTHER PUBLICATIONS

Ackermann, Prospects of Kinematic GPS Aerial Triangulation, ITC Journal, 1992.
(Continued)

*Primary Examiner* — Amir Alavi
(74) *Attorney, Agent, or Firm* — Dunlap Codding, P.C.

(57) ABSTRACT

Image processing systems and methods are disclosed, including an image processing system comprising a computer running image processing software causing the computer to: divide an oblique aerial image into a plurality of sections, choose reference aerial image(s), having a consistent color distribution, for a first section and a second section; create a color-balancing transformation for the first and second sections of the oblique aerial image such that the first color distribution of the first section matches the consistent color distribution of the chosen reference aerial image and the second color distribution of the second section matches the consistent color distribution of the chosen reference aerial image; color-balance pixel(s) in the first and section sections of the oblique aerial image, such that at least one color-balancing transformation of the first
(Continued)

and second sections matches the consistent color distribution of the reference aerial image(s).

20 Claims, 4 Drawing Sheets
(1 of 4 Drawing Sheet(s) Filed in Color)

Related U.S. Application Data continuation of application No. 15/357,490, filed on Nov. 21, 2016, now abandoned, which is a continuation of application No. 14/632,732, filed on Feb. 26, 2015, now Pat. No. 9,503,615, which is a continuation of application No. 14/153,772, filed on Jan. 13, 2014, now Pat. No. 8,971,624, which is a continuation of application No. 13/181,259, filed on Jul. 12, 2011, now Pat. No. 8,649,596, which is a continuation of application No. 11/871,740, filed on Oct. 12, 2007, now Pat. No. 7,991,226.

(51) Int. Cl.
  H04N 1/60 (2006.01)
  G06T 5/00 (2006.01)
  G06T 7/90 (2017.01)

(52) U.S. Cl.
  CPC ............ *G06T 7/90* (2017.01); *H04N 1/6077* (2013.01); *H04N 1/6083* (2013.01); *G06T 2207/10024* (2013.01); *G06T 2207/10032* (2013.01)

(58) Field of Classification Search
  CPC ...... H04N 1/60; H04N 1/6027; H04N 1/6083; H04N 9/045
  See application file for complete search history.

(56) References Cited

U.S. PATENT DOCUMENTS

| | | | |
|---|---|---|---|
| 3,594,556 A | 7/1971 | Edwards | |
| 3,614,410 A | 10/1971 | Bailey | |
| 3,621,326 A | 11/1971 | Hobrough | |
| 3,661,061 A | 5/1972 | Tokarz | |
| 3,716,669 A | 2/1973 | Watanabe et al. | |
| 3,725,563 A | 4/1973 | Woycechowsky | |
| 3,864,513 A | 2/1975 | Halajian et al. | |
| 3,866,602 A | 2/1975 | Furihata | |
| 3,877,799 A | 4/1975 | O'Donnell | |
| 4,015,080 A | 3/1977 | Moore-Searson | |
| 4,044,879 A | 8/1977 | Stahl | |
| 4,184,711 A | 1/1980 | Wakimoto | |
| 4,240,108 A | 12/1980 | Levy | |
| 4,281,354 A | 7/1981 | Conte | |
| 4,344,683 A | 8/1982 | Stemme | |
| 4,360,876 A | 11/1982 | Girault et al. | |
| 4,382,678 A | 5/1983 | Thompson et al. | |
| 4,387,056 A | 6/1983 | Stowe | |
| 4,396,942 A | 8/1983 | Gates | |
| 4,463,380 A | 7/1984 | Hooks | |
| 4,489,322 A | 12/1984 | Zulch et al. | |
| 4,490,742 A | 12/1984 | Wurtzinger | |
| 4,491,399 A | 1/1985 | Bell | |
| 4,495,500 A | 1/1985 | Vickers | |
| 4,527,055 A | 7/1985 | Harkless et al. | |
| 4,543,603 A | 9/1985 | Laures | |
| 4,586,138 A | 4/1986 | Mullenhoff et al. | |
| 4,635,136 A | 1/1987 | Ciampa et al. | |
| 4,653,136 A | 3/1987 | Denison | |
| 4,653,316 A | 3/1987 | Fukuhara | |
| 4,673,988 A | 6/1987 | Jansson et al. | |
| 4,686,474 A | 8/1987 | Olsen et al. | |
| 4,688,092 A | 8/1987 | Kamel et al. | |
| 4,689,748 A | 8/1987 | Hofmann | |
| 4,707,698 A | 11/1987 | Constant et al. | |
| 4,758,850 A | 7/1988 | Archdale et al. | |
| 4,805,033 A | 2/1989 | Nishikawa | |
| 4,807,024 A | 2/1989 | Mclaurin et al. | |
| 4,814,711 A | 3/1989 | Olsen et al. | |
| 4,814,896 A | 3/1989 | Heitzman et al. | |
| 4,843,463 A | 6/1989 | Michetti | |
| 4,899,296 A | 2/1990 | Khattak | |
| 4,906,198 A | 3/1990 | Cosimano et al. | |
| 4,953,227 A | 8/1990 | Katsuma et al. | |
| 4,956,872 A | 9/1990 | Kimura | |
| 5,034,812 A | 7/1991 | Rawlings | |
| 5,086,314 A | 2/1992 | Aoki et al. | |
| 5,121,222 A | 6/1992 | Endoh et al. | |
| 5,138,444 A | 8/1992 | Hiramatsu | |
| 5,155,597 A | 10/1992 | Lareau et al. | |
| 5,164,825 A | 11/1992 | Kobayashi et al. | |
| 5,166,789 A | 11/1992 | Myrick | |
| 5,191,174 A | 3/1993 | Chang et al. | |
| 5,200,793 A | 4/1993 | Ulich et al. | |
| 5,210,586 A | 5/1993 | Grage et al. | |
| 5,231,435 A | 7/1993 | Blakely | |
| 5,247,356 A | 9/1993 | Ciampa | |
| 5,251,037 A | 10/1993 | Busenberg | |
| 5,265,173 A | 11/1993 | Griffin et al. | |
| 5,267,042 A | 11/1993 | Tsuchiya et al. | |
| 5,270,756 A | 12/1993 | Busenberg | |
| 5,296,884 A | 3/1994 | Honda et al. | |
| 5,335,072 A | 8/1994 | Tanaka et al. | |
| 5,337,093 A | 8/1994 | Kaneko et al. | |
| 5,342,999 A | 8/1994 | Frei et al. | |
| 5,345,086 A | 9/1994 | Bertram | |
| 5,353,055 A | 10/1994 | Hiramatsu | |
| 5,363,318 A * | 11/1994 | McCauley | H04N 1/6027 348/E17.005 |
| 5,369,443 A | 11/1994 | Woodham | |
| 5,402,170 A | 3/1995 | Parulski et al. | |
| 5,414,462 A | 5/1995 | Veatch | |
| 5,467,271 A | 11/1995 | Abel et al. | |
| 5,481,479 A | 1/1996 | Wight et al. | |
| 5,486,948 A | 1/1996 | Imai et al. | |
| 5,506,644 A | 4/1996 | Suzuki et al. | |
| 5,508,736 A | 4/1996 | Cooper | |
| 5,555,018 A | 9/1996 | von Braun | |
| 5,563,654 A | 10/1996 | Song | |
| 5,604,534 A | 2/1997 | Hedges et al. | |
| 5,617,224 A | 4/1997 | Ichikawa et al. | |
| 5,633,946 A | 5/1997 | Lachinski et al. | |
| 5,668,593 A | 9/1997 | Lareau et al. | |
| 5,677,515 A | 10/1997 | Selk et al. | |
| 5,798,786 A | 8/1998 | Lareau et al. | |
| 5,835,133 A | 11/1998 | Moreton et al. | |
| 5,841,574 A | 11/1998 | Willey | |
| 5,844,602 A | 12/1998 | Lareau et al. | |
| 5,852,753 A | 12/1998 | Lo et al. | |
| 5,894,323 A | 4/1999 | Kain et al. | |
| 5,899,945 A | 5/1999 | Baylocq et al. | |
| 5,963,664 A | 10/1999 | Kumar et al. | |
| 6,037,945 A | 3/2000 | Loveland | |
| 6,088,055 A | 7/2000 | Lareau et al. | |
| 6,094,215 A | 7/2000 | Sundahl et al. | |
| 6,097,854 A | 8/2000 | Szeliski et al. | |
| 6,108,032 A | 8/2000 | Hoagland | |
| 6,130,705 A | 10/2000 | Lareau et al. | |
| 6,157,747 A | 12/2000 | Szeliski et al. | |
| 6,167,300 A | 12/2000 | Cherepenin et al. | |
| 6,222,583 B1 | 4/2001 | Matsumura et al. | |
| 6,236,382 B1 | 5/2001 | Kawakami et al. | |
| 6,236,886 B1 | 5/2001 | Cherepenin et al. | |
| 6,249,315 B1 * | 6/2001 | Holm | H04N 1/4072 348/251 |
| 6,256,004 B1 | 7/2001 | Izumi et al. | |
| 6,256,057 B1 | 7/2001 | Mathews et al. | |
| 6,373,522 B2 | 4/2002 | Mathews et al. | |
| 6,421,610 B1 | 7/2002 | Carroll et al. | |
| 6,434,280 B1 | 8/2002 | Peleg et al. | |
| 6,594,388 B1 * | 7/2003 | Gindele | H04N 1/6027 358/520 |

(56) References Cited

U.S. PATENT DOCUMENTS

| | | | |
|---|---|---|---|
| 6,597,818 B2 | 7/2003 | Kumar et al. | |
| 6,639,596 B1 | 10/2003 | Shum et al. | |
| 6,650,771 B1* | 11/2003 | Walker | H04N 1/60 382/162 |
| 6,664,973 B1* | 12/2003 | Iwamoto | G06T 5/009 345/589 |
| 6,711,475 B2 | 3/2004 | Murphy | |
| 6,714,243 B1* | 3/2004 | Mathur | H04N 9/045 348/273 |
| 6,731,329 B1 | 5/2004 | Feist et al. | |
| 6,747,686 B1 | 6/2004 | Bennett | |
| 6,754,279 B2* | 6/2004 | Zhou | G06T 1/60 348/E9.01 |
| 6,791,711 B1* | 9/2004 | Uekusa | H04N 1/6027 358/1.9 |
| 6,810,383 B1 | 10/2004 | Loveland | |
| 6,816,819 B1 | 11/2004 | Loveland | |
| 6,826,539 B2 | 11/2004 | Loveland | |
| 6,829,584 B2 | 12/2004 | Loveland | |
| 6,834,128 B1 | 12/2004 | Altunbasak et al. | |
| 6,876,763 B2 | 4/2005 | Sorek et al. | |
| 7,009,638 B2 | 3/2006 | Gruber et al. | |
| 7,018,050 B2 | 3/2006 | Ulichney et al. | |
| 7,046,401 B2 | 5/2006 | Dufaux et al. | |
| 7,061,650 B2 | 6/2006 | Walmsley et al. | |
| 7,065,260 B2 | 6/2006 | Zhang et al. | |
| 7,123,382 B2 | 10/2006 | Walmsley et al. | |
| 7,127,348 B2 | 10/2006 | Smitherman et al. | |
| 7,133,551 B2 | 11/2006 | Chen | |
| 7,142,984 B2 | 11/2006 | Rahmes et al. | |
| 7,184,072 B1 | 2/2007 | Loewen et al. | |
| 7,233,691 B2 | 6/2007 | Setterholm | |
| 7,262,790 B2 | 8/2007 | Bakewell | |
| 7,348,895 B2 | 3/2008 | Lagassey | |
| 7,397,972 B2 | 7/2008 | Shimizu et al. | |
| 7,457,458 B1 | 11/2008 | Daniel et al. | |
| 7,509,241 B2 | 3/2009 | Guo | |
| 7,728,833 B2 | 6/2010 | Verma | |
| 7,832,267 B2 | 11/2010 | Woro | |
| 7,844,499 B2 | 11/2010 | Yahiro | |
| 7,991,226 B2* | 8/2011 | Schultz | H04N 1/6083 382/167 |
| 8,078,396 B2 | 12/2011 | Meadow | |
| 8,649,596 B2* | 2/2014 | Schultz | G06T 7/90 382/167 |
| 8,705,843 B2 | 4/2014 | Lieckfeldt | |
| 8,971,624 B2* | 3/2015 | Schultz | H04N 1/6083 382/167 |
| 9,503,615 B2* | 11/2016 | Schultz | G06T 11/001 |
| 10,580,169 B2* | 3/2020 | Schultz | G06T 5/001 |
| 2002/0041328 A1 | 4/2002 | LeCompte et al. | |
| 2002/0041717 A1 | 4/2002 | Murata et al. | |
| 2002/0114536 A1 | 8/2002 | Xiong et al. | |
| 2003/0014224 A1 | 1/2003 | Guo et al. | |
| 2003/0043824 A1 | 3/2003 | Remboski et al. | |
| 2003/0088362 A1 | 5/2003 | Melero et al. | |
| 2003/0164962 A1 | 9/2003 | Nims et al. | |
| 2003/0214585 A1 | 11/2003 | Bakewell | |
| 2004/0057633 A1 | 3/2004 | Mai et al. | |
| 2004/0105090 A1 | 6/2004 | Schultz et al. | |
| 2004/0167709 A1 | 8/2004 | Smitherman et al. | |
| 2005/0073241 A1 | 4/2005 | Yamauchi et al. | |
| 2005/0088251 A1 | 4/2005 | Matsumoto | |
| 2005/0169521 A1 | 8/2005 | Hel-Or | |
| 2006/0028550 A1 | 2/2006 | Palmer et al. | |
| 2006/0080037 A1 | 4/2006 | Borg et al. | |
| 2006/0092043 A1 | 5/2006 | Lagassey | |
| 2006/0195858 A1 | 8/2006 | Takahashi et al. | |
| 2006/0238383 A1 | 10/2006 | Kimchi et al. | |
| 2006/0250515 A1 | 11/2006 | Koseki et al. | |
| 2007/0024612 A1 | 2/2007 | Balfour | |
| 2007/0046448 A1 | 3/2007 | Smitherman | |
| 2007/0050340 A1 | 3/2007 | Von Kaenel et al. | |
| 2007/0237420 A1 | 10/2007 | Steedly et al. | |
| 2008/0120031 A1 | 5/2008 | Rosenfeld et al. | |
| 2008/0123994 A1 | 5/2008 | Schultz et al. | |
| 2008/0136752 A1 | 6/2008 | Inoue et al. | |
| 2008/0158256 A1 | 7/2008 | Russell et al. | |
| 2008/0273090 A1 | 11/2008 | Niimura | |
| 2009/0174836 A1 | 7/2009 | Yoo et al. | |
| 2009/0177458 A1 | 7/2009 | Hochart et al. | |
| 2009/0208095 A1 | 8/2009 | Zebedin | |
| 2009/0304227 A1 | 12/2009 | Kennedy et al. | |
| 2010/0296693 A1 | 11/2010 | Thornberry et al. | |
| 2011/0033110 A1 | 2/2011 | Shimamura et al. | |
| 2013/0246204 A1 | 9/2013 | Thornberry et al. | |
| 2016/0209716 A1* | 7/2016 | Kim | G02F 1/134309 |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| ES | 2266704 T | 3/2007 |
| JP | 2003/317089 A | 11/2003 |
| MX | PA05004987 | 2/2006 |
| WO | WO99/18732 | 4/1999 |
| WO | WO/2000/053090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.-30.1.2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

(56) References Cited

OTHER PUBLICATIONS

Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.agp.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.
Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=,1999.
Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al., "Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.

(56) References Cited

OTHER PUBLICATIONS

McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung und Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 200I.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
APPLANIX Corp, Robust, Precise Position and Orientation Solutions, POS/AV & POS/DG Installation & Operation Manual, Redefining the way you survey, May 19, 1999, Ontario, Canada.
APPLANIX Corp, Robust, Precise Position and Orientation Solutions, POS/AV V4 Ethernet & Disk Logging ICD, Redefining the way you survey, Revision 3, Apr. 18, 2001, Ontario, Canada.
International Search Authority—U.S.; International Search Report and Written Opinion regarding PCT/US08/75909; dated Jan. 12, 2009.
Chandeller, Laure; and Martinoty, Gilles, "A Radiometric Aerial Triangulation for the Equalization of Digital Aerial Images and Orthoimages," Photogrammetric Engineering & Remote Sensing, vol. 75, No. 2, Feb. 2009, pp. 193-200.
Canadian Patent Office; Canadian Office Action dated Sep. 27, 2013 for application 2,702,258.
Applicant; Response to Sep. 27, 2013 Canadian Office Action regarding application 2,702,258; dated Mar. 26, 2014.
Canadian Patent Office; Canadian Office Action dated Apr. 23, 2014 for application 2,702,258.
Applicant; Response to Apr. 23, 2014 Canadian Office Action regarding application 2,702,258; dated Oct. 8, 2014.
Canadian Patent Office; Canadian Office Action dated Nov. 27, 2014 for application 2,702,258.
Applicant; Response to Nov. 27, 2014 Canadian Office Action regarding application 2,702,258; dated May 27, 2015.
European Patent Office; Supplementary European search report and European search opinion regarding European Patent Application No. 08838178.5 PCT/US200807509; dated Aug. 8, 2013.
Ming-Sui, Lee, et al., "Pixel and Compressed-Domain Color Matching Techniques for Video Mosaic Applications," Visual Communications and Image Processing, Jan. 20, 2004; San Jose, XP030081342, Ch. 2.1.
Kim, D-H, et al., "An Efficient Method to build panoramic image mosaics," Pattern Recognition Letters, Elsevier, vol. 24, No. 14, pp. 2421-2429, Oct. 1, 2003, XP004437193, Technical Fields, ISSN: 0167-8655.
Applicant; Response to Aug. 8, 2013 Supplementary European search report and European search opinion regarding European Patent Application No. 08838178.5; dated Mar. 6, 2014.
USPTO, Office Action regarding U.S. Appl. No. 12/031,576, dated Dec. 21, 2010.
Pictometry International Corp., Response to Office Action regarding U.S. Appl. No. 12/031,576, dated Jun. 21, 2011.
USPTO, Office Action regarding U.S. Appl. No. 12/031,576, dated Sep. 16, 2011.
Pictometry International Corp., Response to Office Action regarding U.S. Appl. No. 12/031,576, dated Mar. 16, 2012.
USPTO, Office Action regarding U.S. Appl. No. 12/031,576, dated Nov. 27, 2012.
Pictometry International Corp., Response to Office Action regarding U.S. Appl. No. 12/031,576, dated Jan. 15, 2013.
Luong et al., "Fully Parallel Superconducting Analog-to-Digital Converter", IEEE Transactions on Applied Superconductivity, vol. 3, No. 1, Mar. 1993, pp. 2633-2636.
European Patent Office, Examination Report regarding European Patent Application No. 08838178.5, dated Nov. 8, 2016.
Pictometry International Corp., Response to Examination Report regarding European Patent Application No. 08838178.5, dated Mar. 10, 2017.
European Patent Office, Summons to Attend Oral Proceedings regarding European Patent Application No. 08838178.5, dated Feb. 8, 2018.
Pictometry International Corp., Written Submission in Response to Summons to Attend Oral Proceedings regarding European Patent Application No. 08838178.5, dated May 25, 2018.
European Patent Office, Communication Maintaining Oral Proceedings regarding European Patent Application No. 08838178.5, dated Jun. 12, 2018.
European Patent Office, Decision to Refuse European Patent Application No. 08838178.5, dated Jul. 12, 2018.
Pictometry International Corp., Appeal Grounds regarding European Patent Application No. 08838178.5, dated Nov. 12, 2018.
Rochester Institute of Technology, "Wildfire Airborne Sensor Program (WASP) Project Overview," Chester F. Carlson Center for Imaging Science, Industrial Associates Meeting, May 13, 2003.

\* cited by examiner

SYSTEM AND PROCESS FOR COLOR-BALANCING A SERIES OF OBLIQUE IMAGES

CROSS-REFERENCE TO RELATED APPLICATIONS

This application is a continuation of U.S. Ser. No. 16/191,232, filed Nov. 14, 2018; which is a continuation of U.S. Ser. No. 15/357,490, filed Nov. 21, 2016, now abandoned; which is a continuation of U.S. Ser. No. 14/632,732, filed Feb. 26, 2015, now U.S. Pat. No. 9,503,615; which is a continuation of U.S. Ser. No. 14/153,772, filed Jan. 13, 2014, now U.S. Pat. No. 8,971,624; which is a continuation of U.S. Ser. No. 13/181,259, filed Jul. 12, 2011, now U.S. Pat. No. 8,649,596 issued Feb. 11, 2014, which is a continuation of U.S. Ser. No. 11/871,740, filed on Oct. 12, 2007, now U.S. Pat. No. 7,991,226 issued Aug. 2, 2011; the entire contents of all of which are hereby expressly incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE § 1.52(E)(5)). THE TOTAL NUMBER OF COMPACT DISCS INCLUDING DUPLICATES AND THE FILES ON EACH COMPACT DISC SHALL BE SPECIFIED

Not Applicable.

BACKGROUND OF THE INVENTION

In the remote sensing/aerial imaging industry, imagery is used to capture views of a geographic area and be able to measure objects and structures within the images as well as to be able to determine geographic locations of points within the image. These are generally referred to as "geo-referenced images" and come in two basic categories:

1. Captured Imagery—these images have the appearance as they were captured by the camera or sensor employed.
2. Projected Imagery—these images have been processed and converted such that they confirm to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down.

In addition to capturing an image with the camera pointing straight down, it is possible to capture an image with the camera pointing at an oblique angle. The resulting imagery is generally referred to as an "oblique image" or as an "oblique aerial image." The capture of oblique aerial images presents additional challenges compared to the capture of nadir images, generally due to the introduction of the oblique angle.

An example of a system that captures both nadir and oblique images is shown in FIG. 1. Airplane 10 is flying over the Earth 12 and capturing images utilizing three cameras 14a, 14b and 14c. FIG. 1 also illustrates the sun 16 positioned in a northern hemisphere orientation. The camera 14a is shown directed in a southern orientation generally towards the sun 16, the camera 14b is shown directed straight down, and the camera 14c is shown directed in a northern orientation generally away from the sun 16. The cameras 14a and 14c capture "oblique images", while the camera 14b captures "nadir images".

The oblique images present a more natural appearance than a nadir image because they show not just the roofs, as is the case of a nadir image, but also the sides of objects and structures. This is what we are most accustomed to seeing. In order to preserve this natural perspective, oblique images are generally presented without being ortho-rectified and instead left in the natural appearance that the camera captures. This practice makes it very easy for people to look at something in an oblique image and realize what that object is.

However, the sun/sky orientation when an oblique image is taken has a major impact on the color balance of the resulting photograph due to the reflections of light from the sun 16. There are two major types of reflection: diffuse and specular. Flat wall paint is a highly diffuse reflector—that is, light bounces nearly equally in all directions. A mirror is a highly specular reflector—that is, light bounces almost entirely in one direction off the mirror. There is nothing in nature that is a perfect specular or a perfect diffuse reflector—everything is some combination of the two. It is the specular nature of objects that presents a problem for color balancing oblique images.

Color balancing nadir aerial images is known in the art. However, color balancing oblique aerial images presents unique challenges. When collecting nadir images (images captured with camera 14b pointing straight down), every image has a consistent orientation with respect to the sun 16. However, when collecting oblique images (images captured with the cameras 14a and 14c pointing at an oblique angle relative to the horizon) different images have different orientations with respect to the sun 16. For instance, in the northern hemisphere, a camera aimed to the north (camera 14c) points away from the sun 16, while a camera aimed to the south (camera 14a) points toward the sun 16.

Specular reflections bounce off a surface and leave the surface at roughly the same angle with which they hit the surface—like a ball bouncing off a flat surface. When the camera 14a is pointing towards the sun 16, the camera 14a picks up specular reflections from the sun 16 and therefore any images captured with that camera pick up a strong yellow/red tint to the captured scene. The camera 14c, on the other hand, is pointing away from the sun 16 and picks up specular reflections from the sky and therefore any images captured with that camera pick up a strong blue tint to the scene. When these two images are viewed side by side, the difference can be very noticeable and distracting to the overall image appearance. It is desirable to color balance the oblique images such that they have a substantially consistent color tone.

Shown in FIG. 2 is a diagrammatic view of the capturing of three different overlapping images of a same scene from three different positions. The three different positions are labeled as Position A, Position B and Position C for purposes of clarity. The scene is positioned in the northern hemisphere, and thus, the image captured from Position A is taken with the camera positioned in a southern orientation toward the sun 16, while the image captured from Position C is taken with the camera positioned in a northern orientation away from the sun 16. The image captured from Position B is taken with the camera positioned directly above the scene. In this example, the image captured from Position A has a yellow/reddish tint due to the strong specular reflections from the sun 16, the image captured from Position B has a neutral tint due to roughly equal specular reflections from the sun 16 and sky, and the image captured from Position C has a bluish tint due to the strong specular reflections from the sky.

Referring to FIG. 3, shown therein is a diagrammatic view of the capturing of an oblique image of the Earth 12 where a field of view of the camera is designated with the lines $P_1$ and $P_2$. The lines $P_1$ and $P_2$ represent path lengths, i.e., the distance the light travels from a scene on the Earth 12 to the camera. In an oblique image, the path lengths $P_1$ and $P_2$ are significantly different and this presents a second challenge to color balancing oblique images: the top of the image goes through significantly more atmosphere than the bottom of the image. In a nadir image, path length (the distance the light must travel from a scene on the Earth 12 to the camera) at the edges of the useable image are typically not all that much different than the path length to the nadir point. For instance, lines $P_3$ and $P_4$ represent the path lengths for a typical camera/lens configuration, the difference between the shortest path length (straight down) and the longest path length (to the far corner) is only about 6%.

But with oblique images, because of the nature of trigonometry, when the field of view angle is added to the oblique camera axis angle, the path lengths $P_1$ and $P_2$ are very different. To illustrate an extreme, if the top of the camera is pointed above the horizon then the path length $P_1$ is infinite—clearly much longer than the path length $P_2$ at the front of the image. In a typical camera/lens configuration and at a typical oblique angle, the difference between the shortest path length (to the middle front of the image) and the longest path length (to the far back corner of the image) is about 87%—nearly twice as long.

The challenge this difference in path length presents is that the light from the scene captured by the top of the camera travels through a lot more atmosphere than the light from the scene captured by the bottom of the camera. This results in more tinting or scattering, an increased introduction of blue sky light, an increase in blurriness, and a decrease in clarity due to smog or haze. Thus, if the image is color balanced based upon the tinting in the top of the image then the color balancing of the bottom of the image will be incorrect. Likewise, if the image is color-balanced based upon the tinting in the bottom of the image then the color-balancing of the top of the image will be incorrect. One could color-balance based upon the tinting in the middle of the image, but then the color-balancing of the top and bottom of the image would be incorrect.

In light of the foregoing, there is a need for a system and process for color-balancing oblique images that overcomes the challenges discussed above. It is to such a system and process that the present invention is directed.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
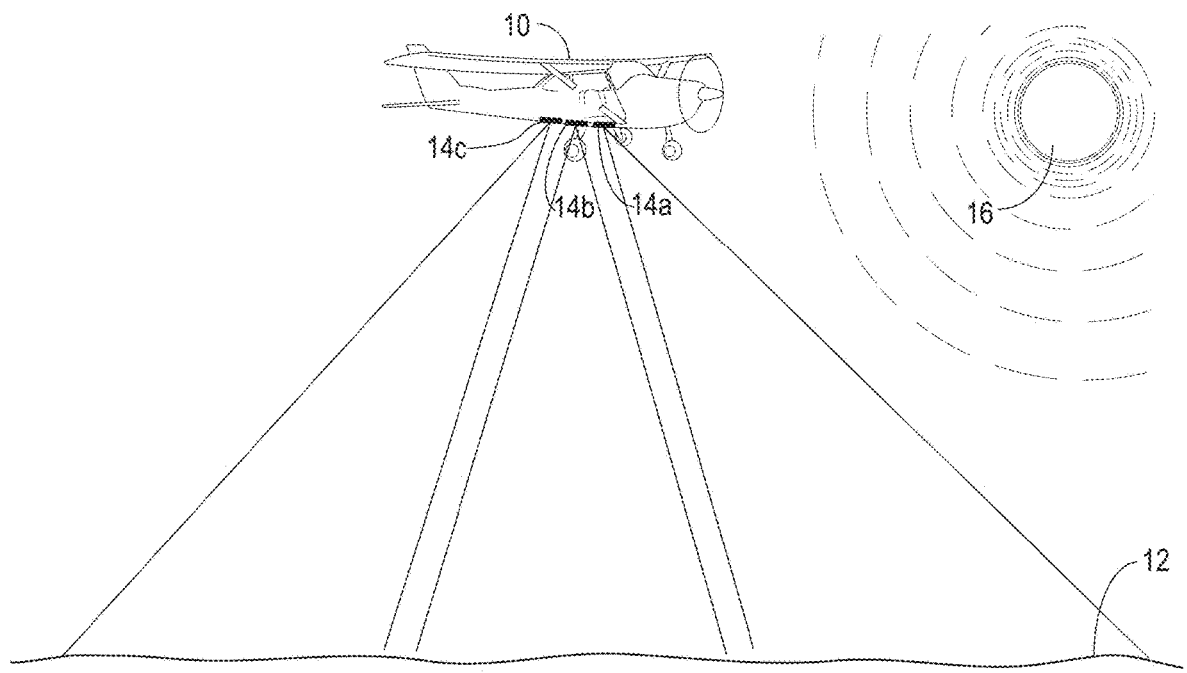
FIG. 1 is a diagrammatic view of an airplane flying over the Earth and capturing images utilizing three cameras.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

The processes described in this patent provide a means for color balancing oblique images so that they take on a consistent color tone. The principal behind these processes is to select a set of color-balanced images to use as reference images to create color-balance transformations for a series of oblique images so that the resulting color-balanced oblique images will have a color tone similar to the reference images. Because they typically have a consistent sun/sky orientation, nadir images are often the best choice for the reference images; however, this is not required. It is recommended that the reference images be from a consistent sun/sky orientation, so, for instance, instead of the nadir images, the north-looking oblique images could be used as the reference images and the remaining oblique images transformed to match their color tone.

The consistent color tone for the reference images can be achieved in a variety of manners, such as by having images that are naturally balanced, i.e., captured under similar conditions and/or orientations and therefore already have a consistent color tone, or by color-balancing the images to each other after they are captured so that they have a consistent color tone. Or nadir images captured under different conditions can first be color-balanced to each other to produce a consistent color tone. There are numerous methods for color-balancing nadir images described in remote sensing textbooks—basically any method that produces a consistent color tone for a set of similar images will work. As these methods for nadir images are known in the art, they are not discussed here.

Once the reference images have been selected, the oblique images can be color balanced to match. This is accomplished by finding one or more portion(s) of reference image(s) that correspond to the same area of the scene contained within the oblique image—in other words, finding their areas of overlap.

In a preferred embodiment, the reference images and the oblique images are geo-referenced so that finding the portions of the references image(s) corresponding to the same area of the scene contained within the oblique images can be accomplished with a computer and thereby automated.

Thus, in the preferred embodiment, the logic of the process described herein is executed by a computer to provide an automated process for color-balancing a series of oblique images.

Figure 4:
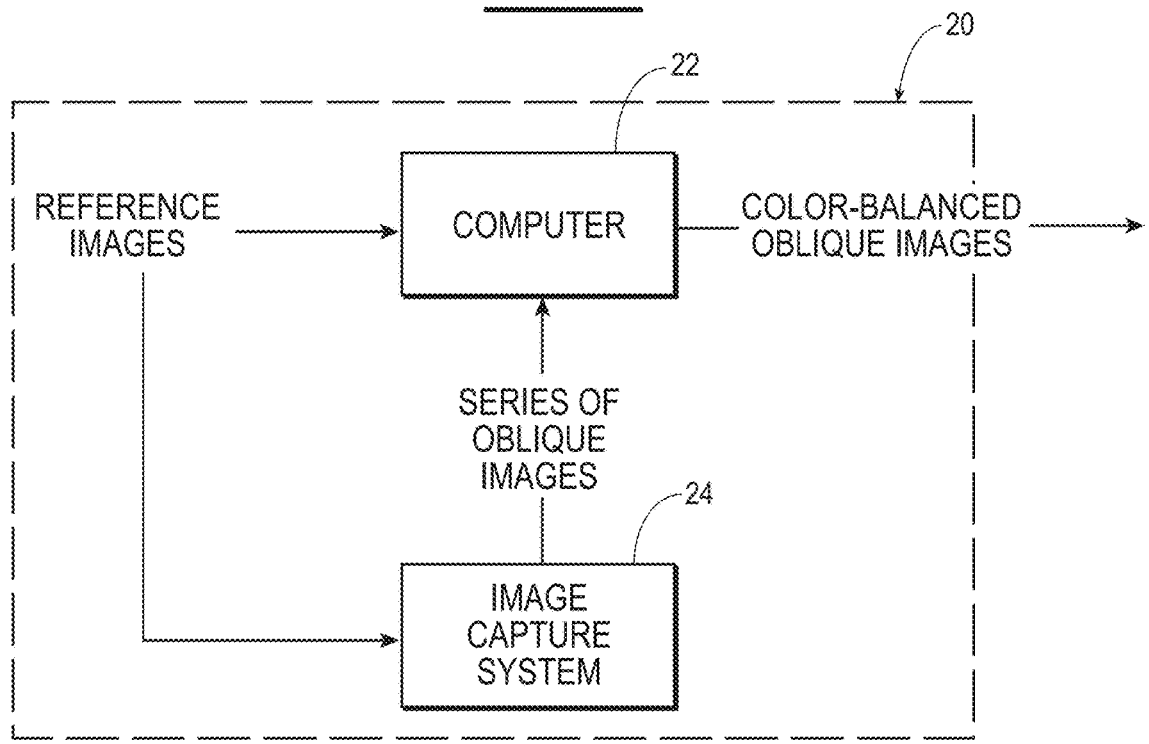
FIG. 4 is a schematic view of an image processing system constructed in accordance with the present invention.

Referring now to the drawings, and in particular to FIG. 4, shown therein and designated by a reference numeral 20 is an image processing system constructed in accordance with the present invention. In general, the image processing system 20 is provided with a computer 22, and a camera system 24. As will be described in more detail below, the image processing system 20 is adapted to color balance the series of oblique images captured from one or more positions and from one or more orientations so that such oblique images are provided with a substantially consistent color balance thereby reducing or even eliminating the unwanted yellowish/reddish or bluish tinting described above.

In general, the computer 22 receives a series of reference images, and a series of oblique images from the camera system 24. The reference images and the oblique images can be received by the computer system 22 either directly or indirectly from the camera system 24, and can be passed from the camera system 24 either in batches, in real-time with the capturing of the reference images and/or the oblique images, or at a period of time substantially after the capturing of the reference images and the oblique images. For example, the reference images and/or the oblique images can be transmitted or transferred from the camera system 24 to the computer system 22 days and/or weeks and/or years after the capturing of the reference images and the oblique images from the camera system 24.

The computer 22 preferably runs image processing software (or firmware) adapted to perform the functions described herein, and the resulting images and data are stored on one or more computer readable mediums. Examples of a computer readable medium include an optical storage device, a magnetic storage device, an electronic storage device or the like. The term "Computer" as used herein means a system or systems that are able to embody and/or execute the logic of the processes described herein. The logic embodied in the form of software instructions or firmware may be executed on any appropriate hardware which may be a dedicated system or systems, or a general purpose computer system, a personal computer system or distributed processing computer system, all of which are well understood in the art, and a detailed description of how to make or use such computer systems is not deemed necessary herein. When the computer 22 is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the images, or thereafter or combinations thereof.

Figure 2:
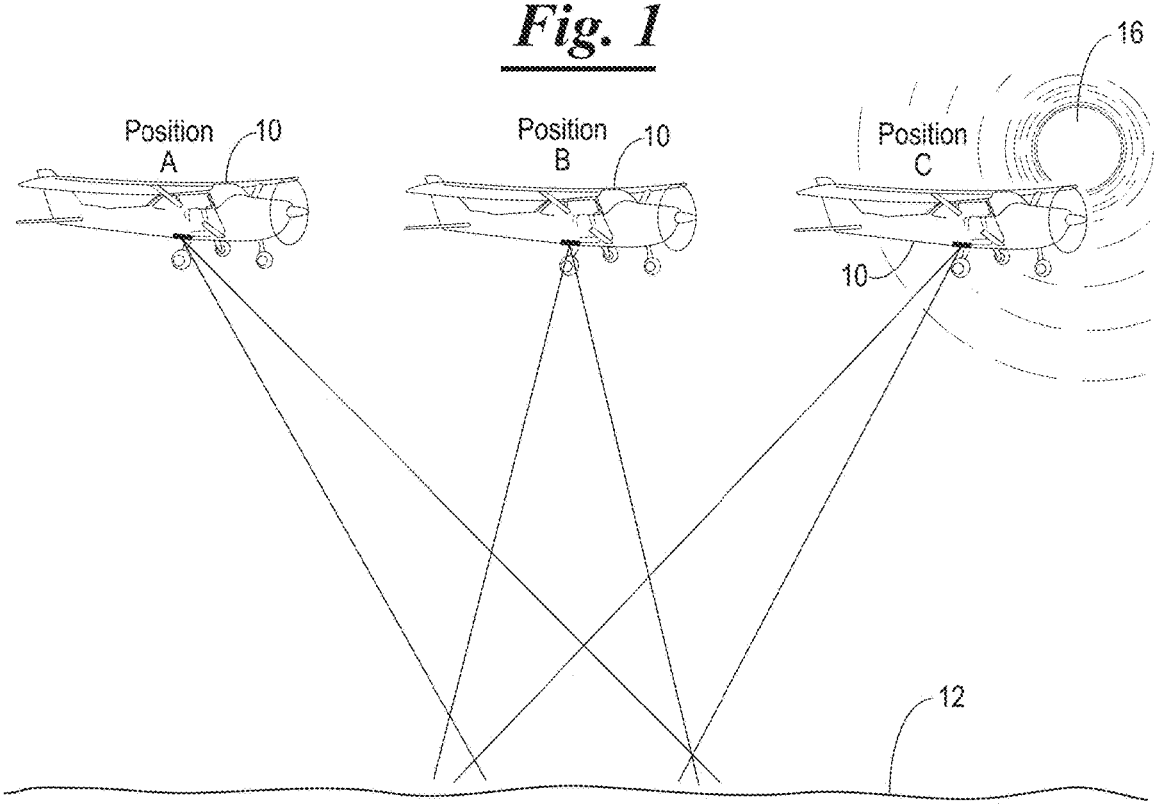
FIG. 2 is a diagrammatic view of the capturing of three different overlapping images of a same scene from three different positions.
Figure 3:
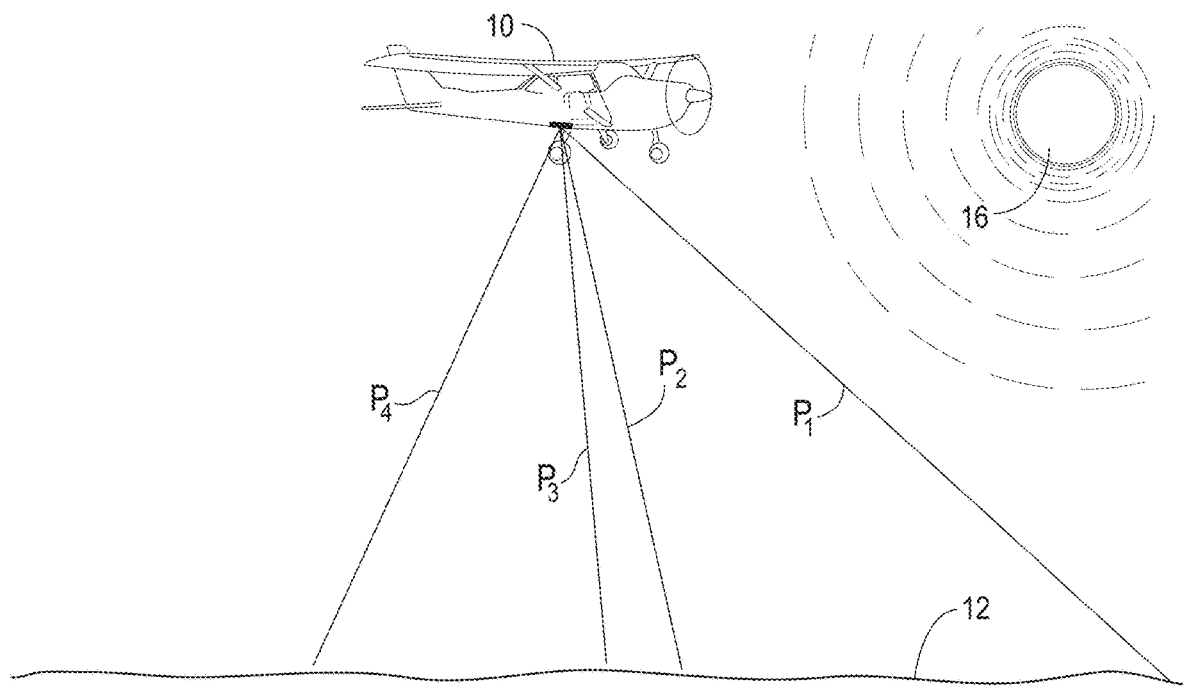
FIG. 3 is a diagrammatic view of the capturing of an oblique image of the Earth 12 where a field of view of an oblique aerial camera is designated utilizing the path lengths $P_1$ and $P_2$, i.e., the distance the light travels from a scene on the Earth to the camera, and a field of view of a nadir aerial camera is designated utilizing path lengths $P_3$ and $P_4$.

The image capture system 24 is typically used for capturing aerial images as shown in FIGS. 1-3. Suitable image capture systems are shown and described in a provisional patent application identified by U.S. Ser. No. 60/901,444, the entire content of which is hereby incorporated herein by reference. Typically, the image capture system 24 is provided with, one or more image capture devices, one or more monitoring systems, one or more event multiplexer systems, and one or more data storage units or computer systems. In the examples depicted in FIGS. 1-3 of U.S. Ser. No. 60/901, 444, the "image capture system 10" is provided with four image capture devices mounted in a sweep pattern (see FIG. 1 of U.S. Ser. No. 60/901,444); five image capture devices mounted in a 360 pattern having image capture devices pointing fore, aft, port, starboard and straight down (see FIG. 2 of U.S. Ser. No. 60/901,444); or four image capture devices mounted in separate directions generally aligned with respective parts of streets (see FIG. 3 of U.S. Ser. No. 60/901,444).

In certain embodiments, the image capture devices of the image capture system 24 can be mounted to a moving platform such as a manned airplane, an unmanned airplane, a train, an automobile such as a van, a boat, a four wheeler, a motor cycle, a tractor, a robotic device or the like.

As discussed above, the computer 22 executes instructions to effect the color-balancing of the series of oblique images captured from one or more positions and from one or more orientations. On an oblique image by oblique image basis, the computer 22 is programmed with instructions to locate one or more portions of one or more reference images that overlap the oblique image, and then create a color balancing transformation that approximately matches the color distribution of the oblique image to the color distribution of the overlapping portions of the reference images. Then, the computer 22 transforms pixels in the oblique image according to the color balancing transformation created for that oblique image, and then preferably stores the transform pixel values in the oblique image or a copy of the oblique image. The oblique images having the transformed pixel values are referred to herein after as "color-balanced oblique images".

In a preferred embodiment, the reference images are geo-referenced to aid in the location of the overlapping portion(s), and also color-balanced. The reference images can be color-balanced either naturally because they are captured from a consistent orientation, or they can be color-balanced using well-known practices. In a preferred embodiment, the reference images are nadir images.

In a preferred embodiment, the overlapping portions of the reference images and the oblique images have a similar scene because it is expected that the scenes will be somewhat different. For example, assuming that the scene includes a building, the oblique images will show the sides of the building while the nadir images will not. Typically, the closer the scene contents in the overlapping portion(s) match (Leaf-on, leaf off, flooding, snow, or the like) the better the results. Ideally, the reference images and the oblique images will be taken during the same photo shoot to enhance the similarity of the lighting and scene content.

Preferably, one or more color balancing transformation is created for each of the oblique images in the series of oblique images. However, it should be understood that the one or more color balancing transformations do not have to be made for each of the oblique images in the series. In other words, not all of the oblique images in the series of oblique images must be color-balanced in accordance with the present invention. In addition, while all of the pixels in the oblique image are preferably transformed according to the one or more color balancing transformation created for that particular oblique image, it should be understood that less than all of the pixels can be transformed. For example, the pixels in the oblique image can be organized into groups, and then a certain percentage of such pixels (such as 60-90%) can be transformed.

Figure 7:
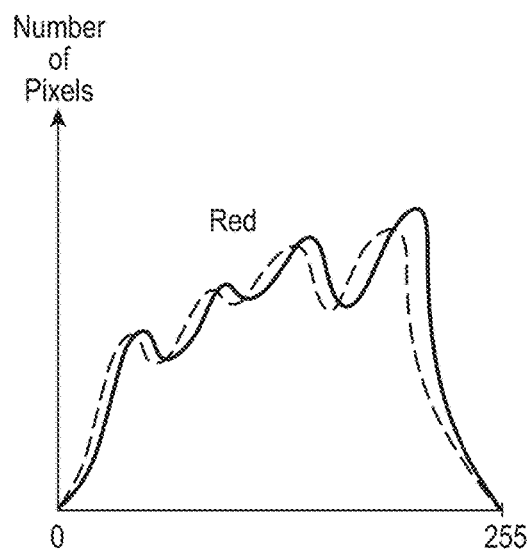
FIG. 7 is a histogram of a color distribution for a red color band of an oblique image in accordance with the present invention.
Figure 8:
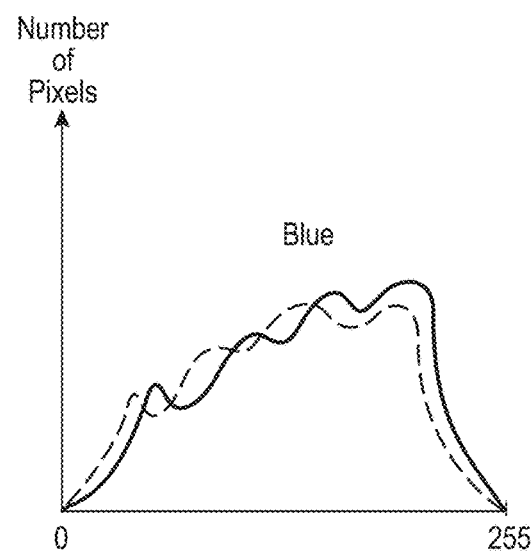
FIG. 8 is a histogram of a color distribution of a blue color band of an oblique image in accordance with the present invention.
Figure 9:
FIG. 9 is a portion of a color oblique image captured by a camera angled away from the sun.
Figure 10:
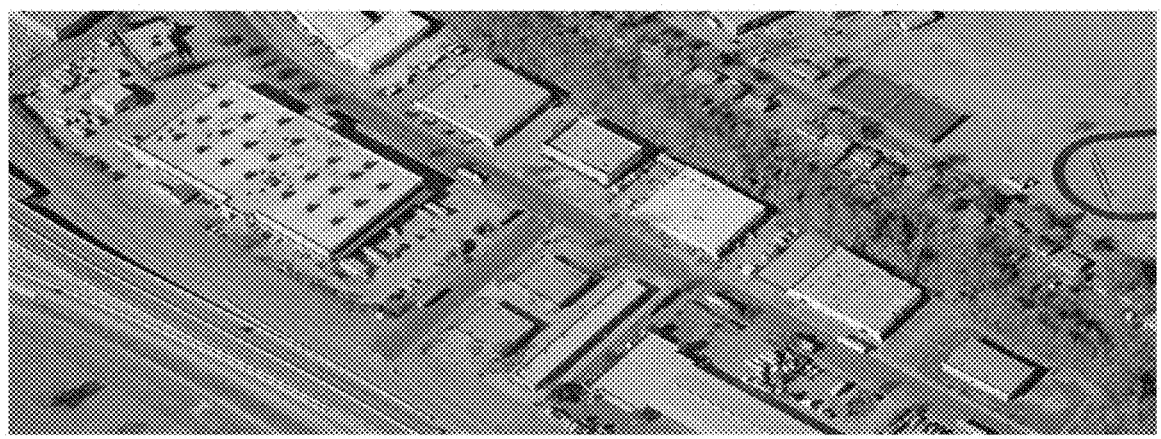
FIG. 10 is a portion of a color oblique image of the same area depicted in FIG. 9 but captured by a camera angled toward the sun.

In general, the automated process preferably (1) divides each oblique image in the series into a plurality of sections, (2) identifies a portion of a reference image overlapping the section, and then (3) creates a color-balancing transformation. Preferably a color-balancing transformation for each color band in the color space is created and for each section in the oblique image approximating the color distribution of the overlapping section in the one or more reference images. For example, assuming an RGB color space, a histogram of the color distribution for each color band, i.e., red, green and blue in each section of the oblique image and the overlapping portion of the same scene in the nadir image (develop two histograms for each section) is created. Exemplary histograms for the red and blue color bands are shown in FIGS. 7 and 8. The color space can be any suitable color space, such as RGB, XYZ, LUV, CMYK, or false color IR.

The color distribution histogram of an image shows the number of pixels for each pixel value within the range of the image. If the minimum value of the image is 0 and the maximum value of the image is 255, the histogram of the image shows the number of pixels for each value ranging between and including 0 and 255. Peaks in the histogram represent more common values within the image that usually consist of nearly uniform regions. Valleys in the histogram represent less common values. Empty regions within the histogram indicate that no pixels within the image contain those values. The solid lines shown in the histograms in FIGS. 7 and 8 show exemplary values of an aerial oblique image that has not yet been color-balanced while the dashed lines shown in the histograms show exemplary values of the same aerial oblique image that has been color-balanced utilizing the process described herein.

The solid line in the histogram of FIG. 7 shows the color distribution of the red band for an oblique image that was captured by a camera pointing in a generally south direction and that has a reddish tint due to the specular reflections from the sun 16, while the dashed line shows a reduction in the red pixel values in the color-balanced image. Similarly, the solid line in the histogram of FIG. 8 shows the color distribution of the blue band for an oblique image that was captured by a camera pointing in a generally north direction and that has a bluish tint due to the specular reflections from the sky. The dashed line in FIG. 8 shows a reduction in the blue pixel values in the color-balanced image.

Figure 5:
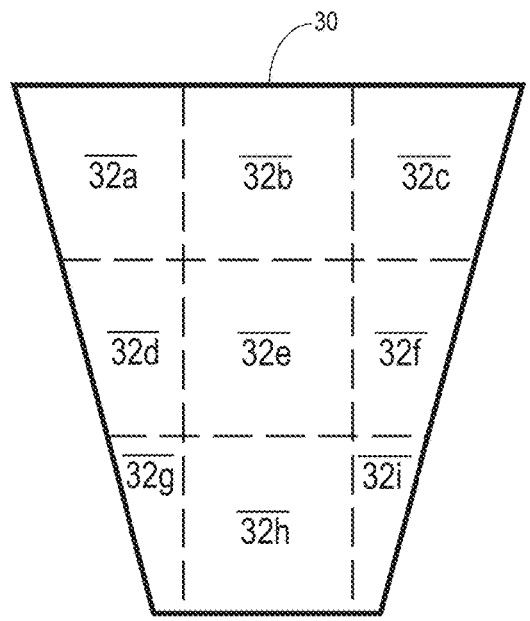
FIG. 5 is a schematic view of an oblique image that has been sectioned in accordance with the present invention.
Figure 6:
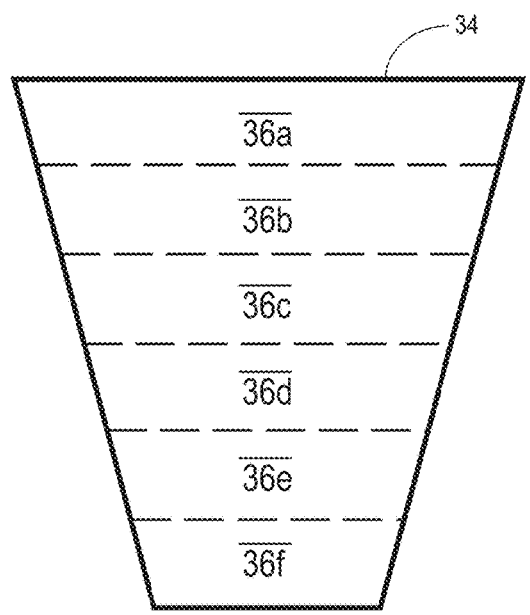
FIG. 6 is a schematic view of another example of an oblique image that has been sectioned in accordance with the present invention.

To color-balance the series of oblique images, each of the oblique images are preferably divided into a plurality of sections. For example, an oblique image 30 shown in FIG. 5 has been divided into nine sections 32*a-i*, and the oblique image 34 shown in FIG. 6 has been divided into 6 sections 36*a-f*. Any number of sections can be used, but dividing the oblique image 30 into more sections decreases the likelihood of variability in the image. For example, oblique images can change color depending upon their orientation and the distance that the scene is away from the camera. Images taken in a direction away from the sun 16 are usually bluer at the top, while images taken in a direction toward the sun 16 have a reddish-orange cast. The number, size and location of the sections within the oblique images can be predetermined or randomly determined.

Once the oblique image has been divided into sections, then, on a section by section basis one or more portions of a reference image is located that overlaps the oblique image section. Then, a color-balancing transformation is created that approximately matches the color distribution of the oblique image section to the color distribution of the overlapping reference portion(s). This can be accomplished using any suitable algorithm or technique, such as histogram equalization. Histogram equalization is a well known algorithm, so no further comments are deemed necessary to teach one skilled in the art how to make and use histogram equalization. For the oblique image 30 that has been divided into nine oblique image sections 32*a-i*, this process occurs nine times.

For each section, at least three histograms (color distribution for the overlapping reference portion, color distribution for the oblique image section, and color balancing transformation for the oblique image section) are created for each color band in the color space.

Then, pixel values for each color band in each of the oblique images are color-balanced and blended to provide a substantially consistent color tone. This can be accomplished by using a combination of the color-balancing transformations (e.g., histograms) for the oblique image. The blending may be accomplished through bi-linear interpolation, linear interpolation, cubics, splines and/or the like. Alternatively, one transform may be used for the entire image.

In a preferred embodiment, the color-balancing and blending is accomplished as follows. First, on a pixel by pixel basis, for the oblique image to be color-balanced, one or more oblique image sections are selected which apply to the particular pixel. Then, for each color band, the pixel value is calculated independently (or transformed) using the color balancing transformation for each selected oblique image section yielding a transformed pixel value for each selected oblique image section. Then, the transformed pixel values are blended into a single resulting pixel value using any suitable algorithm, such as bi-linear interpolation, linear interpolation, cubics, splines or the like. Then, the resulting pixel value is stored in the oblique image or a copy (such as a memory copy) of the oblique image. This process is preferably repeated for every pixel in the oblique image. However, it should be understood that this process could only be repeated for a subset of the pixels.

In general, the process described above may be performed on a continuous or intermittent basis. For example, once the section color balancing transformations are created, such section color balancing transformations can be stored, and then applied on a pixel by pixel basis at a later time to color-balance the oblique image. For example, the color-balancing transformations can be stored with the oblique image and then utilized to color-balance the oblique image when it is retrieved or displayed.

Set forth hereinafter is pseudo-code for one embodiment of the present invention:

```
Select oblique images to adjust
Select reference images
For( each image to be color-balanced ){
    Divide image into sections
    For( each image section used ){
        Choose one or more overlapping reference images
        If ( only one reference image is chosen ) {
            Create section color-balancing transformation from chosen
            reference image
        }
        Else {
            Create empty section color-balancing transformation
            For ( each chosen reference image ){
                Create temporary color-balancing transformation
                for this chosen reference image
                Combine temporary color-balancing transformation
                into section color-balancing transformation
            }
        }
    }
    For (each pixel to be transformed){
        Create empty final pixel value
        For (each image section used){
            If (section is applicable to pixel){
                Compute transformed pixel value from section color-
                balancing transformation
                Blend transformed pixel value into final pixel value
            }
        }
        Store final pixel value
    }
}
```

For RGB color images, the above process is repeated three times, once for each color pixel component, i.e. the red pixels, the green pixels, and the blue pixels, each with its own color-balancing transformation.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below. The term "comprising" within the claims is intended to mean "including at least" such that the recited listing of elements in a claim are an open group. "A," "an" and other singular terms are intended to include the plural forms thereof unless specifically excluded.

What is claimed is:

1. An image processing system, comprising:
   a computer having image processing software that, when executed by the computer, causes the computer to:
   divide an oblique aerial image into a plurality of sections, wherein a first section of the plurality of sections has a first color distribution and a second section of the plurality of sections has a second color distribution, the first color distribution differing from the second color distribution, and wherein each of the first section and the second section has pixels, each pixel having one or more color band;
   choose one or more reference aerial image, having a consistent color distribution, for the first section and the second section by automatically matching at least a portion of geographic information of the one or more reference aerial image with at least a portion of geographic information of the first section and the second section;
   create one or more first color-balancing transformation for one or more color band for the first section of the oblique aerial image, to match the first color distribution of the first section to the consistent color distribution of the chosen reference aerial image;
   color-balance one or more pixel in the first section of the oblique aerial image using the one or more first color-balancing transformation, such that the first color distribution of the first section matches the consistent color distribution of the chosen reference aerial image;
   create one or more second color-balancing transformation for the one or more color band for the second section of the oblique aerial image, to match the second color distribution of the second section to the consistent color distribution of the chosen reference aerial image; and
   color-balance one or more pixel in the second section of the oblique aerial image using the one or more second color-balancing transformation, such that the second color distribution of the second section matches the consistent color distribution of the chosen reference aerial image.

2. The image processing system of claim 1, wherein creating one or more color-balancing transformation for one or more color band for the first section and the second section of the oblique aerial image comprises creating a corresponding color-balancing transformation for each color band in a color space of the first section and the second section.

3. The image processing system of claim 1, wherein creating one or more color-balancing transformation for one or more color band for the first section comprises creating two color-balancing transformations for two color bands for the first section, wherein color-balancing one or more pixel in the first section further comprises combining the two color-balancing transformations into a single pixel color value.

4. The image processing system of claim 1, wherein the one or more color band comprises a red color band.

5. The image processing system of claim 1, wherein the one or more color band comprises a blue color band.

6. The image processing system of claim 1, wherein the one or more color band comprises a green color band.

7. The image processing system of claim 1, wherein the first color distribution of the first section of the oblique aerial image is caused by first specular reflections and the second color distribution of the second section of the oblique aerial image is caused by second specular reflections.

8. The image processing system of claim 1, wherein a difference between the first color distribution of the first section of the oblique aerial image and the second color distribution of the second section of the oblique aerial image is based on differing path length distances between a first location of a first point in the first section and a camera when the oblique aerial image was captured and a second location of a second point in the second section and the camera when the oblique aerial image was captured.

9. The image processing system of claim 1, wherein the one or more reference aerial image comprises a nadir aerial image.

10. The image processing system of claim 1, wherein the one or more reference aerial image comprises another oblique aerial image.

11. An image processing method for color-balancing oblique images, comprising:

dividing, with a computer running image processing software, an oblique aerial image into a plurality of sections, wherein a first section of the plurality of sections has a first color distribution and a second section of the plurality of sections has a second color distribution, the first color distribution differing from the second color distribution, and wherein each of the first section and the second section has pixels, each pixel having at least one color band;

choosing, with the computer, one or more reference aerial image, having a consistent color distribution, for the first section and the second section by automatically matching at least a portion of geographic information of the one or more reference aerial image with at least a portion of geographic information of the first section and the second section;

creating, with the computer, one or more first color-balancing transformation for one or more color band for the first section of the oblique aerial image, to match the first color distribution of the first section to the consistent color distribution of the chosen reference aerial image;

color-balancing, with the computer, one or more pixel in the first section of the oblique aerial image using the one or more first color-balancing transformation, such that the first color distribution of the first section matches the consistent color distribution of the chosen reference aerial image;

creating, with the computer, one or more second color-balancing transformation for the one or more color band for the second section of the oblique aerial image, to match the second color distribution of the second section to the consistent color distribution of the chosen reference aerial image; and color-balancing, with the computer, one or more pixel in the second section of the oblique aerial image using the one or more second color-balancing transformation, such that the second color distribution of the second section matches the consistent color distribution of the chosen reference aerial image.

12. The image processing method of claim 11, wherein creating one or more color-balancing transformation for one or more color band for the first section and the second section of the oblique aerial image comprises creating a corresponding color-balancing transformation for each color band in a color space of the first section and the second section.

13. The image processing method of claim 11, wherein creating one or more color-balancing transformation for one or more color band for the first section comprises creating two color-balancing transformations for two color bands for the first section, wherein color-balancing one or more pixel in the first section further comprises combining the two color-balancing transformations into a single pixel color value.

14. The image processing method of claim 11, wherein the one or more color band comprises a red color band.

15. The image processing method of claim 11, wherein the one or more color band comprises a blue color band.

16. The image processing method of claim 11, wherein the one or more color band comprises a green color band.

17. The image processing method of claim 11, wherein the first color distribution of the first section of the oblique aerial image is caused by first specular reflections and the second color distribution of the second section of the oblique aerial image is caused by second specular reflections.

18. The image processing method of claim 11, wherein a difference between the first color distribution of the first section of the oblique aerial image and the second color distribution of the second section of the oblique aerial image is based on differing path length distances between a first location of a first point in the first section and a camera when the oblique aerial image was captured and a second location of a second point in the second section and the camera when the oblique aerial image was captured.

19. The image processing method of claim 11, wherein the one or more reference aerial image comprises a nadir aerial image.

20. The image processing method of claim 11, wherein the one or more reference aerial image comprises another oblique aerial image.

* * * * *